(12) United States Patent
Guidash (10) Patent No.: US 8,587,681 B2
(45) Date of Patent: Nov. 19, 2013

(54) EXTENDED DEPTH OF FIELD FOR IMAGE SENSOR

(75) Inventor: Robert M. Guidash, Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 606 days.

(21) Appl. No.: 12/275,632

(22) Filed: Nov. 21, 2008

(65) Prior Publication Data

US 2010/0128137 A1   May 27, 2010

(51) Int. Cl.
*H04N 5/225* (2006.01)
*H04N 9/04* (2006.01)
*G03B 7/00* (2006.01)
*H04N 5/235* (2006.01)

(52) U.S. Cl.
USPC .................... 348/218.1; 348/268; 348/362

(58) Field of Classification Search
USPC .................. 348/218.1, 268–283, 362–368
See application file for complete search history.

(56) References Cited

U.S. PATENT DOCUMENTS

| | | |
|---|---|---|
| 3,971,065 A | 7/1976 | Bayer |
| 4,390,895 A | 6/1983 | Sato et al. |
| 5,323,233 A | 6/1994 | Yamagami et al. |
| 5,657,402 A | 8/1997 | Bender et al. |
| 5,748,341 A | 5/1998 | Morikawa |
| 5,748,371 A | 5/1998 | Cathey et al. |
| 6,115,065 A | 9/2000 | Yadid-Pecht et al. |
| 6,476,865 B1 | 11/2002 | Gindele et al. |
| 6,809,766 B1 | 10/2004 | Krymski et al. |
| 7,646,972 B2 * | 1/2010 | Dunko et al. ............... 396/121 |
| 2002/0027600 A1 * | 3/2002 | Yamanaka et al. .......... 348/208 |
| 2004/0130649 A1 * | 7/2004 | Lee .............................. 348/345 |
| 2005/0286800 A1 | 12/2005 | Gouch |
| 2006/0061678 A1 * | 3/2006 | Yamazaki .................... 348/349 |
| 2006/0181681 A1 * | 8/2006 | Katsumata et al. ........... 352/53 |
| 2006/0198623 A1 * | 9/2006 | Ono .............................. 396/89 |
| 2006/0203100 A1 * | 9/2006 | Ajito et al. ................ 348/220.1 |
| 2006/0250515 A1 * | 11/2006 | Koseki et al. ................ 348/362 |
| 2007/0024931 A1 | 2/2007 | Compton et al. |
| 2007/0046807 A1 | 3/2007 | Hamilton, Jr. et al. |
| 2007/0230944 A1 | 10/2007 | Georgiev |

(Continued)

OTHER PUBLICATIONS

Paul Green et al.: "Multi-aperture Photography", ACM Transactions on Graphics ACM USA, vol. 26, No. 3, Jul. 2007, pp. 68-1-68-7, XP002567376, ISSN: 0730-0301, abstract, pp. 68-1; chapter 1 Introduction, pp. 68-2. 68-3; chapter 3 Optical design.

(Continued)

*Primary Examiner* — Sinh Tran
*Assistant Examiner* — Christopher K Peterson
(74) *Attorney, Agent, or Firm* — Blakely Sokoloff Taylor & Zafman LLP (57) ABSTRACT

A method for forming an image, implemented at least in part by a data processing apparatus, by obtaining a first image of a scene from a first subset of pixels in an image sensor array at a first f/# setting, adjusting the imaging optics that obtain light from the scene at a second f/# setting, obtaining a second image of the scene from a second subset of pixels in the image sensor array, and forming a composite image by combining image data from at least the first and second images.

18 Claims, 10 Drawing Sheets

(56) References Cited

U.S. PATENT DOCUMENTS

| | | | |
|---|---|---|---|
| 2007/0280549 A1* | 12/2007 | Ohnishi | 382/255 |
| 2008/0170848 A1* | 7/2008 | Wernersson | 396/335 |
| 2009/0021612 A1* | 1/2009 | Hamilton et al. | 348/249 |
| 2009/0028451 A1* | 1/2009 | Slinger et al. | 382/233 |
| 2009/0135263 A1* | 5/2009 | Sorek et al. | 348/218.1 |
| 2009/0245688 A1* | 10/2009 | Robinson et al. | 382/284 |
| 2009/0274387 A1* | 11/2009 | Jin | 382/274 |

OTHER PUBLICATIONS

Ren Ng, Marc Levoy, Matthieu Bredif, Gene Duval, Mark Horowitz, Pat Hanrahan, "Light Field Photography with a Hand-held Plenoptic Camera" Stanford Tech Report CTSR Feb. 2005, pp. 1-11. Available on-line at Internet address (prefaced http://) graphics.stanford.edu/papers/lfcamera/lfcamera-150dpi.pdf. See p. 1, figs. 2, 10.

PCT International Search Report and Written Opinion for PCT/US2009/006000, mailed Feb. 17, 2010, (9 pgs.).

* cited by examiner

EXTENDED DEPTH OF FIELD FOR IMAGE SENSOR

FIELD OF THE INVENTION

The present invention relates to electronic image capture systems and more particularly relates to an apparatus and readout method for an image sensor array that provides an image having an extended depth of field.

BACKGROUND OF THE INVENTION

Electronic image sensors such as charge coupled device (CCD) image sensors and active pixel sensor (APS) devices are used in many types of electronic imaging systems for generating an electronic representation of a visual image. APS devices, often fabricated in a Complementary Metal Oxide Semiconductor process, are also referred to as CMOS sensors. Typically, these image sensors include a number of light-sensitive pixels (that is, picture elements) arranged in a regular two-dimensional pattern or array of rows and columns, with each individual pixel providing a signal based on the light level of the portion of a scene image projected onto the pixel by a lens.

As a result of ongoing improvements in fabrication and design, CMOS and other APS image sensors may often provide considerably more pixels than are useful for forming an image having reasonably good quality. This is true, for example, for parts of the image that are optically out of focus; no added pixel resolution can compensate for this problem.

Limited depth of field is one consequence of the highly compact packaging that is used for many smaller cameras as well as for cameras integrated into cellphone and other hand-held electronic devices. With the fixed-position lenses or lens systems that are used to provide reduced-profile designs for these compact devices, the depth of field of the optical system can be constrained, set to a fixed value.

The advantages of an extended depth of field are well appreciated by those skilled in the optical imaging arts. Extending the depth of field of an image capture system enables a proportionately larger portion of the captured image to have improved resolution and appear to be in focus and can yield not only an image that is inherently more pleasing to the eye of the viewer, but also provides better input for image processing and analysis utilities and improves the performance of a number of image processing applications, such as contrast adjustment, face- or object-recognition utilities, and other applications, for example.

Conventional methods for providing an extended depth of field include techniques such as focus stacking. Focus stacking uses multiple full resolution images of an object taken in succession, each taken at a different focus position of the optical system, over a desired range of focus positions. The images obtained in this manner are then "stacked" or otherwise selectively combined in order to form a composite image that gives each portion of the image the best focus obtained over the range. Description of focus stacking is given, for example, in U.S. Patent Application No. 2005/0286800 entitled "Method and Apparatus for Forming a Multiple Focus Stack Image" by Gouch.

Other approaches for extending the depth of field have applied wavefront coding, which purposefully introduces aberrations in the camera optics, then uses image processing in order to remove them in the final image. Wavefront coding is described, for example, in U.S. Pat. No. 5,748,371 entitled "Extended Depth of Field Optical System" to Cathey et al.

Yet another approach for extending the depth of field uses plenoptic imaging. A plenoptic image capture device captures image data as well as information about the directional distribution of light from the object. One example of a plenoptic device is given in U.S. Patent Application Publication No. 2007/0230944 entitled "Plenoptic Camera" by Georgiev.

Although some measure of increase to depth of field is provided by each of these conventional approaches, there are drawbacks that limit the utility of each approach. Focus stacking, optimized for macro-photography of still objects, generally requires a tripod or equivalent support for minimizing motion artifacts. With a CMOS sensor, a full image must be obtained at each of a number of focal length settings for obtaining the needed stack of images. This solution can be unworkable for most types of consumer photography or casual photography applications. Wavefront coding requires detailed characterization of the point-spread function (psf) of camera optics and is computationally intensive and complex, typically requiring additional circuitry for frame memory and processing, making this an impractical solution, particularly for video image processing. Plenoptic image capture devices also have inherent computational complexity and require component packaging designs that may not be easily adapted to the narrow profile of hand-held devices such as cellphones and the like.

Thus, it can be seen that although methods exist for enhancing or extending the depth of field of an image sensor and its attendant optical system, these methods may be impractical for many types of portable and hand-held imaging apparatus.

SUMMARY OF THE INVENTION

It is an object of the present invention to advance the art of digital imaging and offer improved depth of field for imaging devices that use electronic imaging sensors. With this object in mind, the present invention provides a method for forming an image, implemented at least in part by a data processing apparatus including the steps of obtaining a first image of a scene from a first subset of pixels in an image sensor array at a first f/# setting, adjusting the imaging optics that obtain light from the scene to a second f/# setting, obtaining a second image of the scene from a second subset of pixels in the image sensor array, and forming a composite image by combining image data from at least the first and second images.

Image capture in accordance with the present invention is particularly suitable for cameras and other types of image capture devices that capture still images, where an enhanced depth of field is desired. Embodiments of the present invention can have broad application and numerous types of image capture devices can effectively use these image capture methods. Such digital imaging apparatus can comprise a digital sensor comprising an array of pixels, wherein the pixels are organized into at least first and second subsets of pixels, wherein each subset of pixels can be separately read, an aperture coupled to an actuator for actuation to at least a first and second aperture setting, and a control logic processor responsive to instructions for controlling the actuator to set the aperture to the first aperture setting and obtain image data content from the first subset of pixels and to set the aperture to the second aperture setting and obtain image data content from the second subset of pixels.

In another embodiment the present invention also relates to a method for forming an image comprising the steps of contemporaneously capturing a plurality of images of a scene content, each image having a different depth of field and a correspondingly different image resolution, determining for each image at least one portion of the image having an image resolution superior to image resolutions of other portions of the image, forming a composite image of the scene content by combining image information from each of the plurality of images and selecting the image information for each image from the at least one portion of each image having superior image resolution.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital imaging devices and related circuitry for signal capture and correction and for exposure control are well known, the present description is directed more specifically to elements and operation related to the present invention. Elements not specifically shown or described herein are selected from those known in the art.

Figures shown and described herein are provided in order to illustrate key principles of operation of the present invention and are not drawn with intent to show actual size or scale. Some exaggeration may be necessary in order to emphasize relative spatial relationships or principles of operation.

Certain aspects of the embodiments to be described are controlled by instructions provided from software, under control of a data processing apparatus, such as a computer, microprocessor, or other type of control logic processor. Given the system as shown and described according to the invention in the following disclosure, software not specifically shown, described or suggested herein that is useful for implementation of the invention is conventional and within the ordinary skill in such arts.

In the context of the present disclosure, the term "partition" has the meaning used in mathematical set theory. A partition of a set S is a collection of disjoint proper, non-empty subsets whose union is the complete set S. It can be observed that this more formal definition of partition differs somewhat in connotation from casual use of the term. However, the formal definition assigned by mathematical set theory is particularly appropriate for defining how pixels in an array can be organized using the method and apparatus of some embodiments of the present invention, as is described in more detail subsequently.

The term "subset", unless otherwise explicitly stated, is used herein to refer to a non-empty subset. For a set S, a subset may comprise the complete set S. A "proper subset" of set S, however, is strictly contained in set S and excludes at least one member of set S. Two subsets are disjoint if their intersection is the empty set, that is, if they have no elements in common.

In the context of an image sensor, a pixel (a contraction of "picture element") refers to a discrete light sensing area and to the charge shifting or charge measurement circuitry associated with that light sensing area. In the context of a digital color image that does not use interpolated values, the term pixel commonly refers to a particular location in the image having associated color intensity values, either limited to one primary color (using filters) or generally panchromatic. The term color pixel will refer to a pixel having a color photoresponse over a defined spectral band.

In the context of the present disclosure, the term "contemporaneous exposure" relates to two or more exposures of the same scene content taken sequentially within a brief period of time. Contemporaneous exposure implies that the scene content for each exposure is substantially the same, with some allowance that must be made for the short interval needed for refreshing or resetting circuitry between individual exposures, for inadvertent camera movement, or for substantially negligible movement of objects in the scene during the short interval between image captures.

In order to better appreciate the apparatus and methods of the present invention, it is useful to review the imaging system components that are used for obtaining an image using an image sensor array and some basic operational sequences that are used for reading out image data in conventional practice.

Functional Parts of Digital Imaging Apparatus

Figure 1:
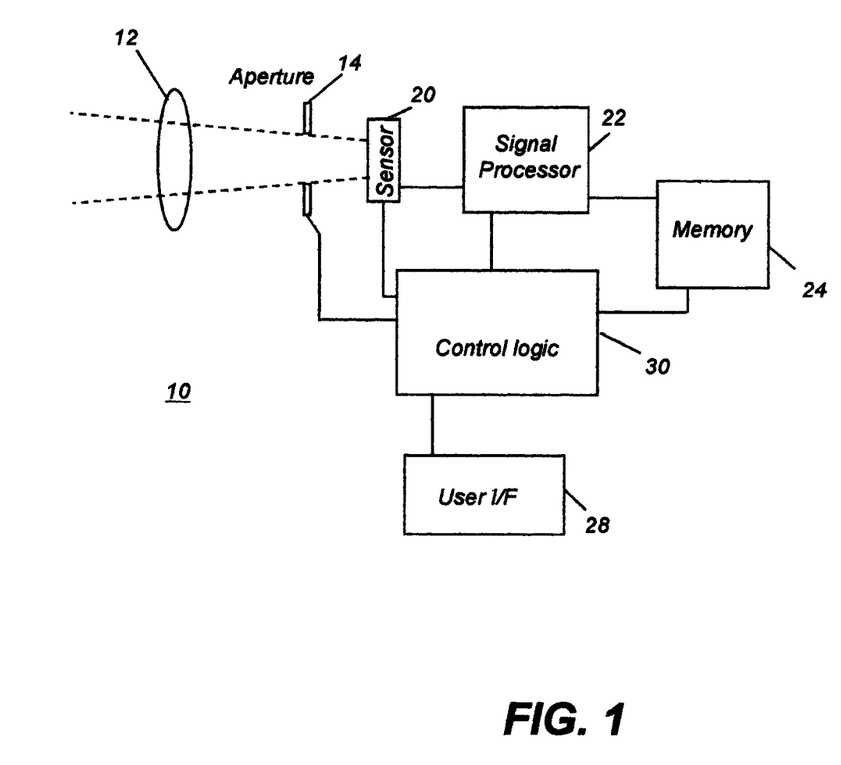
FIG. 1 is a block diagram of a conventional digital still camera system that can employ a conventional sensor and processing methods or the sensor and processing methods of the current invention.

Referring to FIG. 1, there is shown a functional block diagram of the image-capture path in a digital imaging apparatus 10 of the present invention. Digital imaging apparatus 10 is described as a digital camera, but the description that follows also applies generally for other types of hand-held portable or built-in image capture devices, such as on imaging sub-systems included in non-camera devices such as mobile phones, portable computing devices of various types, and automotive vehicles, for example.

Light from the subject scene is incident to input optics, shown as a lens 12 that direct the light through an aperture 14 toward an image sensor array 20. Image sensor array 20 converts the incident light to an electrical signal for each picture element (pixel). Image sensor array 20 of the preferred embodiment can be a charge coupled device (CCD) type or an active pixel sensor (APS) type.

As sensor array 20 is exposed to light, free minority carriers (electrons or holes) are generated and captured within the electronic structure at each pixel. Capturing these free minority carriers for some period of time and then measuring the number of minority carriers captured, or measuring the rate at which free minority carriers are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS sensor).

In an embodiment using APS technology, each pixel of image sensor 20 has both photodetector circuitry and active transistor circuitry for readout of the pixel signal. The photodetector for each pixel in the image sensor array converts photons impinging on the pixel to an electric charge by the photoelectric effect. The charge is integrated over a period of time that is long enough to collect a detectable amount of charge but short enough to avoid saturating storage elements. This integration time period is analogous to a film exposure time (that is, shutter speed). For color imaging, the sensor includes an arrangement of color filters, as described in more detail subsequently.

One mechanism that is particularly useful for embodiments of the present invention is a controllable aperture 14. As is well known in the photographic and optical arts, the "f stop" of the aperture and the lens or imaging system incorporating the aperture", hereafter referred to by the designation "f/#", is a function of the diameter of the opening in aperture 14 and regulates the angle of light that reaches image sensor array 20 and, in doing this, determines the effective Field of View (FOV) and Depth of Field (DOF) of digital imaging apparatus 10, as described in more detail subsequently. Providing digital imaging apparatus 10 with an adjustable aperture 14, whose size is controlled by instructions executed in digital imaging apparatus 10 logic, enables contemporaneous image capture operations to obtain successive images at different f/# settings, as described in more detail subsequently.

In the embodiment shown in FIG. 1, a control logic processor 30 controls the operation of aperture 14 and of image sensor array 20. A signal processor 22 provides the needed signal processing functions for digital image data obtained by sensor array 20. A memory 24 stores image data obtained from signal processor 22 and sensor array 20. Control logic processor 30 also communicates with a user interface 28 for accepting operator commands to control digital imaging apparatus 10.

It must be recognized that the block diagram of FIG. 1 shows a minimal number of components for digital imaging apparatus 10 operating according to embodiments of the present invention and that a number of different elements are often added to the optical path in order to support various imaging functions of the device. For example, additional optical elements such as neutral-density (ND) filters may be interposed in the optical path. A shutter could alternately be used; however, readout timing sequences such as the "rolling readout", described in more detail subsequently, obviate the need for adding a shutter mechanism.

Arrangement of Digital Sensor Array 20

Digital sensor array 20 has an arrangement of several thousands of photosensors disposed in a two-dimensional matrix of rows and columns. In conventional hand-held imaging apparatus, sensor array 20 can easily have a few million pixels, so that these devices describe their imaging capabilities in terms of megapixels ($10^6$ pixels). Representations of sensor array 20 shown in this disclosure present a tiny portion of the array in order to represent its overall arrangement, without regard to considerations of scale, fill factor, or other component-level considerations.

One benefit of advances in miniaturization is evidenced in the large number of pixel-sensing elements that can be fabricated onto a small semiconductor chip. In practice, the number of pixels that can be obtained for a single image can even be well in excess of what is needed when the image is displayed or printed. Thus, pixel data often needs to be grouped, so that a cluster of nearby pixels in the captured image data are combined together to form a single pixel of display or print data.

Embodiments of the present invention take advantage of this high pixel-count in order to obtain additional sets of image data that can be combined to improve the effective depth of field of an obtained digital image. Embodiments of the present invention also take advantage of recent component design improvements that allow a sensor array to be segmented into two or more typically, but not necessarily, disjoint subsets of pixels, wherein readout timing for each subset of pixels can be controlled independently of readout timing for other subsets. This is not a capability currently provided with many conventional image sensor devices. However, design of image sensor array 20 hardware having this capability is within the scope of skills of those who practice the art of image sensor design and fabrication. For a better understanding of how embodiments of the present invention work, it is first useful to have an overview of the conventional arrangement and read-out operation of digital sensor array 20.

In the design of array 20, a number of steps have been taken to maximize the amount of available space for image sensing. For example, analog-digital conversion (ADC) circuitry is not separately provided for each row of pixels; instead, it is common practice to provide only enough storage devices to simultaneously read out the pixels of a single row. Consequently, the pixel signals for the complete 2-dimensional sensor array cannot be measured or read out simultaneously. Instead, pixel sensor signals are read in a serial fashion. In a CCD having a single ADC device, for example, the pixel signals are read out in a raster fashion, that is, row-by-row within the array of pixels and pixel-by-pixel within each row.

The serial nature of image sensor readout directly controls the rate at which the entire sensor array can be read, which is limited by the bandwidth of the readout mechanism. For example, if the read-out mechanism of the image sensor can measure 50 million pixels per second, then it would take about one-tenth of a second to read out a 5 megapixel image sensor. Reducing the time required to read the entire image sensor generally requires increasing power consumption for faster read-out, or increasing the size of the image sensor in order to provide additional read-out channels. Neither increased power consumption nor increased size, however, is desirable for hand-held image capture devices.

Figure 2:
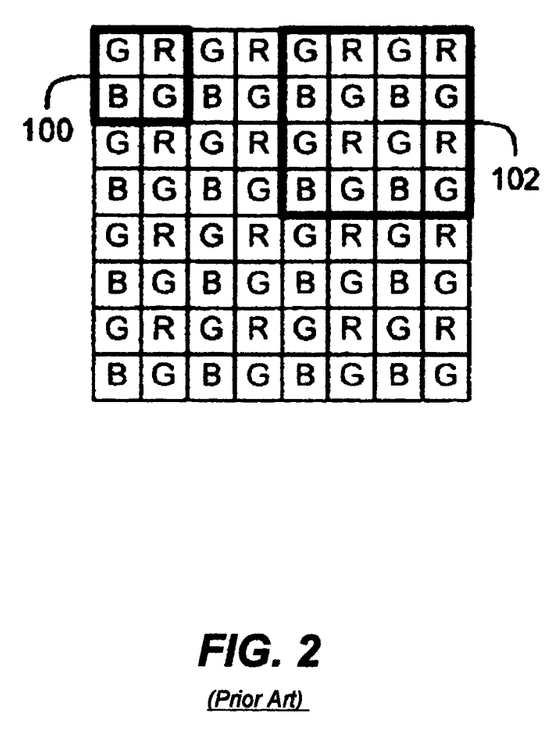
FIG. 2 is a plan view of a conventional Bayer color filter array pattern showing a minimal repeating unit and a non-minimal repeating unit.

In order to produce a color image, image sensor array 20 typically has an overlaid pattern of color filters placed over the pixels. FIG. 2 shows a pattern of red (R), green (G), and blue (B) color filters that is commonly used. This particular pattern is commonly known as a Bayer color filter array (CFA) after its inventor Bryce Bayer, as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum.

A minimal repeating unit is a repeating unit such that no other repeating unit has fewer pixels. For example, the CFA in FIG. 2 includes a minimal repeating unit that is two pixels by two pixels as shown by pixel block 100 in FIG. 2. Multiple copies of this minimal repeating unit are tiled to cover the entire array of pixels in an image sensor. The minimal repeating unit is shown with a green pixel in the upper right corner, but three alternative minimal repeating units can easily be discerned by moving the heavily outlined area one pixel to the right, one pixel down, or one pixel diagonally to the right and down. Although pixel block 102 is a repeating unit, it is not a minimal repeating unit because pixel block 100 is a repeating unit and block 100 has fewer pixels than block 102.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art.

Because it eliminates mechanical parts and reduces cost and space requirements, it is a common practice to design an image capture system having no light-blocking shutter. Such systems rely instead on sensor timing that effectively provides an electronic shutter. This timing scheme operates by resetting each photosensor, integrating charge carriers (photo-electrons or, alternately, holes), and then reading out the photosensor signal in an ordered sequence. The reset step can be accomplished by transferring residual charge from a photosensor to associated floating diffusion circuitry and then discarding the residual charge. During exposure, the photo-electrons accumulate in the photosensor for the prescribed integration time, at which point the charge signal is transferred into the floating diffusion. In CMOS devices, the charge signal is converted to a voltage. The associated voltage is then stored in a memory device such as a capacitor.

If the sensor has sufficiently low dark current and sufficiently good light shielding for the floating diffusion, then the transferred charge need not be read out immediately. Under these conditions, it would be possible to transfer the charge from all pixels at once into their respective floating diffusions and then to wait for a short time as the sequential read-out sequence progressively processes the signals, row by row. Of course, for such a global transfer to work, each pixel would also need to have its own light-shielded floating diffusion.

The method and apparatus of the present invention can work with any of a number of types of read-out sequences for obtaining pixel values from image sensor array 20. Subsequent description shows one method that has particular strengths and advantages with APS and similar array devices, the rolling shutter method. However, it must be emphasized that this is only one of a set of available readout timing schemes that could be used for embodiments of the present invention.

Rolling Shutter Sequence for Image Data Readout

The timing of image capture generally follows one of two basic patterns. In a global capture sequence, exposure signal values for all image pixels are simply exposed and transferred at the same time. However, this type of sequence requires considerable device complexity and can be disadvantageous because it constrains the amount of space on the sensor chip for photo-receptivity. Instead, a row-by-row reading method has been adopted and is often the preferred mode of reading for CMOS APS pixels. This "rolling shutter" sequence avoids the differential exposure problem exhibited in the interlaced fields of a CCD, allowing the exposure for each row to extend for the same length of time, or even allowing different groupings of pixels to have different exposure periods, for example. As an additional advantage, the rolling shutter sequence simplifies sensor component design, since shielded storage is not required for each pixel. However, since the exposure for each row can be independent from the exposures of the other rows and occurs in a sequential (or rolling) fashion with the exposures of the other rows, each successive row, or grouping of pixels within a row, captures its portion of a scene image at a slightly later time than the preceding row. Consequently, relative motion between the scene (or elements of the scene) and the image sensor can cause objects within the scene to appear distorted in the image captured by the image sensor. This distortion effect, termed image "shear", is characteristic of rolling shutter arrangements. For example, if such a so-called rolling shutter or electronic focal plane shutter image sensor is used to capture an image of an automobile moving horizontally, the automobile moves relative to the image sensor as each row of the captured image is exposed and read out, so that each row of the captured image shows the vehicle at a different position. This may cause round car tires to appear to be somewhat oval, and can distort rectangular car windows to appear as parallelograms. Such distortion due to motion is a direct consequence of the amount of time required to read out all the rows of the image sensor. If the rows can be read at a faster rate, then this distortion can be reduced. As noted previously, however, increasing the readout rate generally requires an undesirable increase in cost and power consumption for the image sensor.

For silicon-based image sensors, the pixel components themselves are broadly sensitive to visible light, allowing unfiltered pixels to be suitable for capturing a monochrome image. For capturing color images, a two-dimensional pattern of filters is typically fabricated on the pattern of pixels, with different filter materials used to make individual pixels sensitive to only a portion of the visible light spectrum, as described earlier with reference to FIG. 2.

Figure 3:
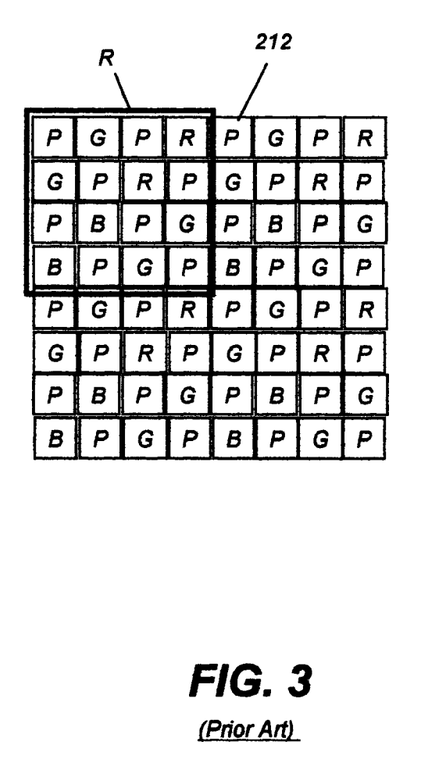
FIG. 3 is a plan view of an alternate sensor array arrangement that uses both color and panchromatic pixels.

As solutions for improving image capture under varying light conditions and for improving overall sensitivity of the imaging sensor, modifications to the familiar Bayer pattern of the above-noted '065 patent have been disclosed. For example, commonly assigned U.S. Patent Applications Publication No. 2007/0046807 entitled "Capturing Images Under Varying Lighting Conditions" by Hamilton et al. and U.S. Patent Application Publication No. 2007/0024931 entitled "Image Sensor with Improved Light Sensitivity" by Compton et al. both describe alternative sensor arrangements that combine color filters with panchromatic (P) filter elements, spatially interleaved in some manner, as shown in an array 212 in FIG. 3. The minimal repeating unit is shown outlined at R. With this type of solution, some portion of the image sensor detects color while the other panchromatic portion is optimized to detect light spanning the visible band for improved dynamic range and sensitivity. These solutions thus provide a pattern of pixels, some pixels with color filters (providing a narrow-band spectral response) and some without (unfiltered "panchromatic" pixels or pixels filtered to provide a broadband spectral response). Using a combination of both narrow- and wide-spectral band pixel response, image sensors can be used at lower light levels or provide shorter exposure times. See, for example, Sato et al. in U.S. Pat. No. 4,390,895, Yamagami et al. in U.S. Pat. No. 5,323,233, and Gindele et al. in U.S. Pat. No. 6,476,865.

In the image sensor array 20 of a CMOS APS device, the integration time, alternately termed the exposure time, is the interval between a reset of a given row of pixels that begins an exposure and a subsequent read or readout of that row that ends the exposure. Since only one row can be selected at a time, the reset/read routine is sequential (that is, row by row). As discussed, this constraint is at the basis of the reading technique referred to as a "rolling electronic shutter" or, more simply, "rolling shutter" mode and is well known in the imaging art. A few examples of variations on rolling shutter time sequencing are given in U.S. Pat. No. 6,115,065 entitled "Image Sensor Producing at Least Two Integration Times from Each Sensing Pixel" to Yadid-Pecht et al. and in U.S. Pat. No. 6,809,766 entitled "Look-Ahead Rolling Shutter System in CMOS Sensors" to Krymski et al. The effective shutter width for the read sequence relates to the time between integration enable and readout. As one method for rolling shutter sequencing, a reset pointer is indexed ahead of a read pointer by an amount equal to the shutter width. The time difference between the two pointers corresponds to the pixel integration time.

Figure 4A:
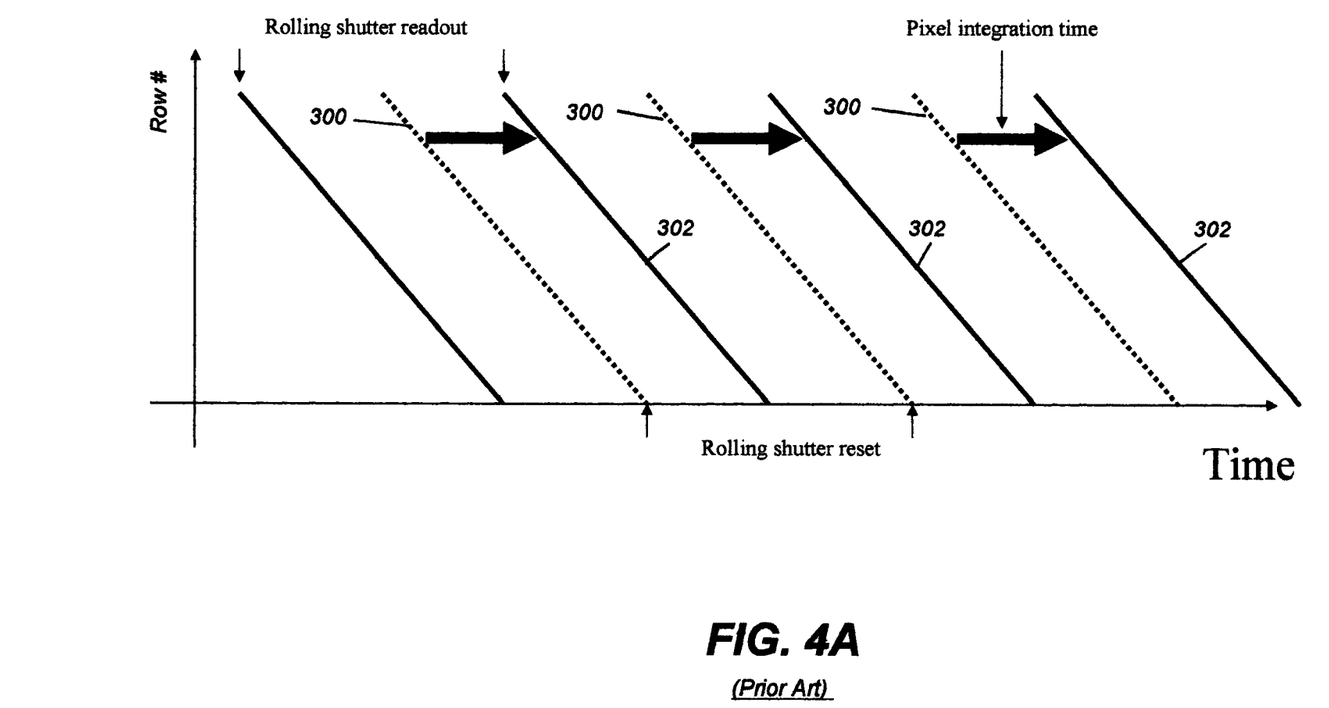
FIG. 4A is a timing diagram that shows rolling shutter timing for a solid-state sensor array.

FIG. 4A shows a timing sequence for the rolling shutter mode as is conventionally represented, under conditions of relatively good illumination in this example. The abscissa (x-axis) represents time. The ordinate (y-axis) represents row number within the sensor array. Each slanted line indicates reading of one shutter width (for example, one or more rows). A reset 300 is performed for each row in sequence. The pixel integration time is indicated by a bold arrow. After a suitable integration time, a read 302 is performed for the row(s).

Figure 4B:
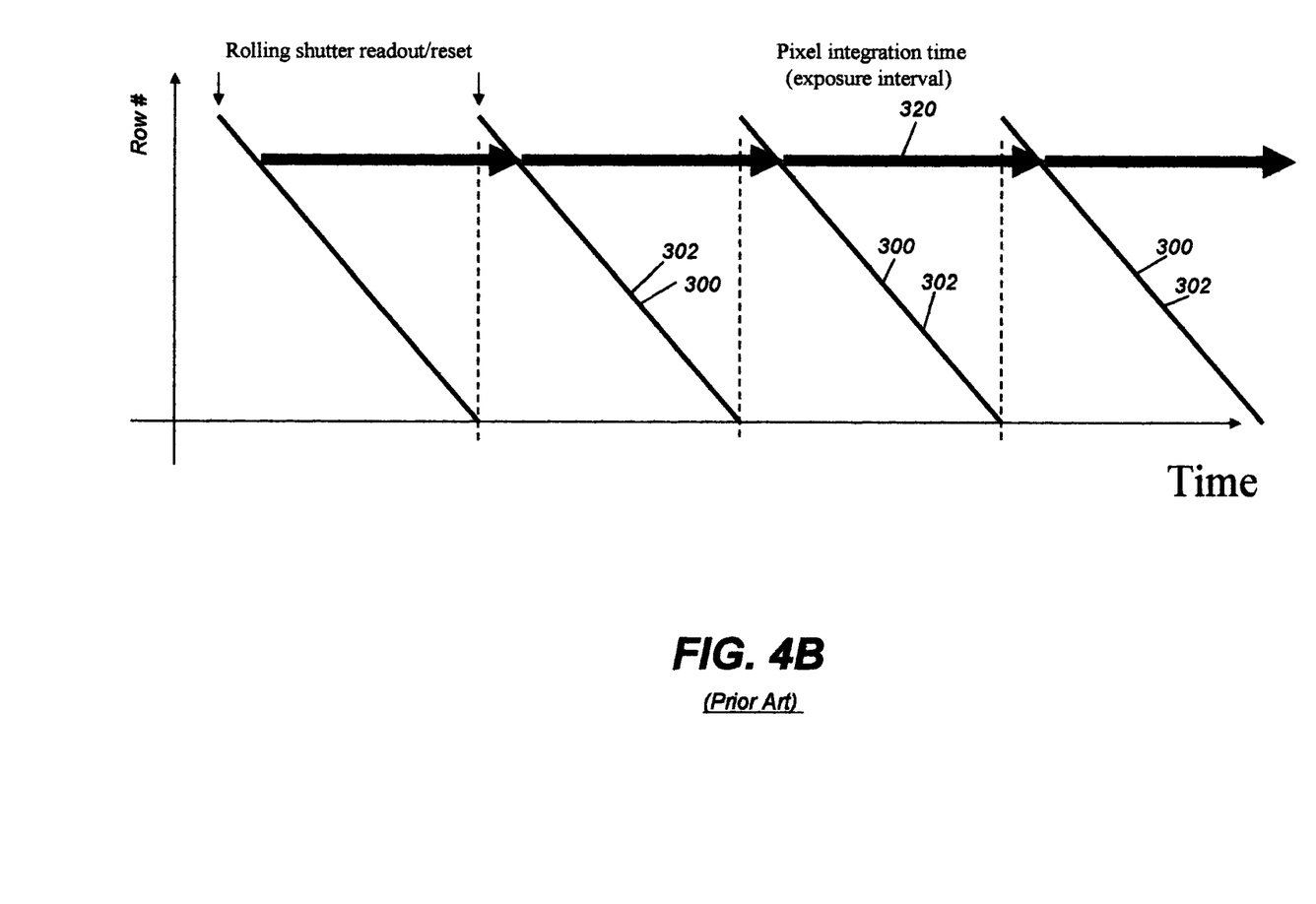
FIG. 4B is a timing diagram that shows alternate rolling shutter timing for a solid-state sensor array.

As can be seen from the timing diagram of FIG. 4A, this conventional rolling shutter sequence allows periods during which no photons are obtained, specifically, between a read 302 and its subsequent reset 300. Although this may be acceptable under good illumination, this arrangement may not perform well under low-light conditions. This is because more pixel integration time may be necessary as light intensity decreases. The timing diagram of FIG. 4B shows alternate timing for low-light conditions. Here, reset 300 is performed immediately following read 302, maximizing the pixel integration time so that incident photons are not wasted.

Forming a Partition of Sensor Array 20

Figure 5:
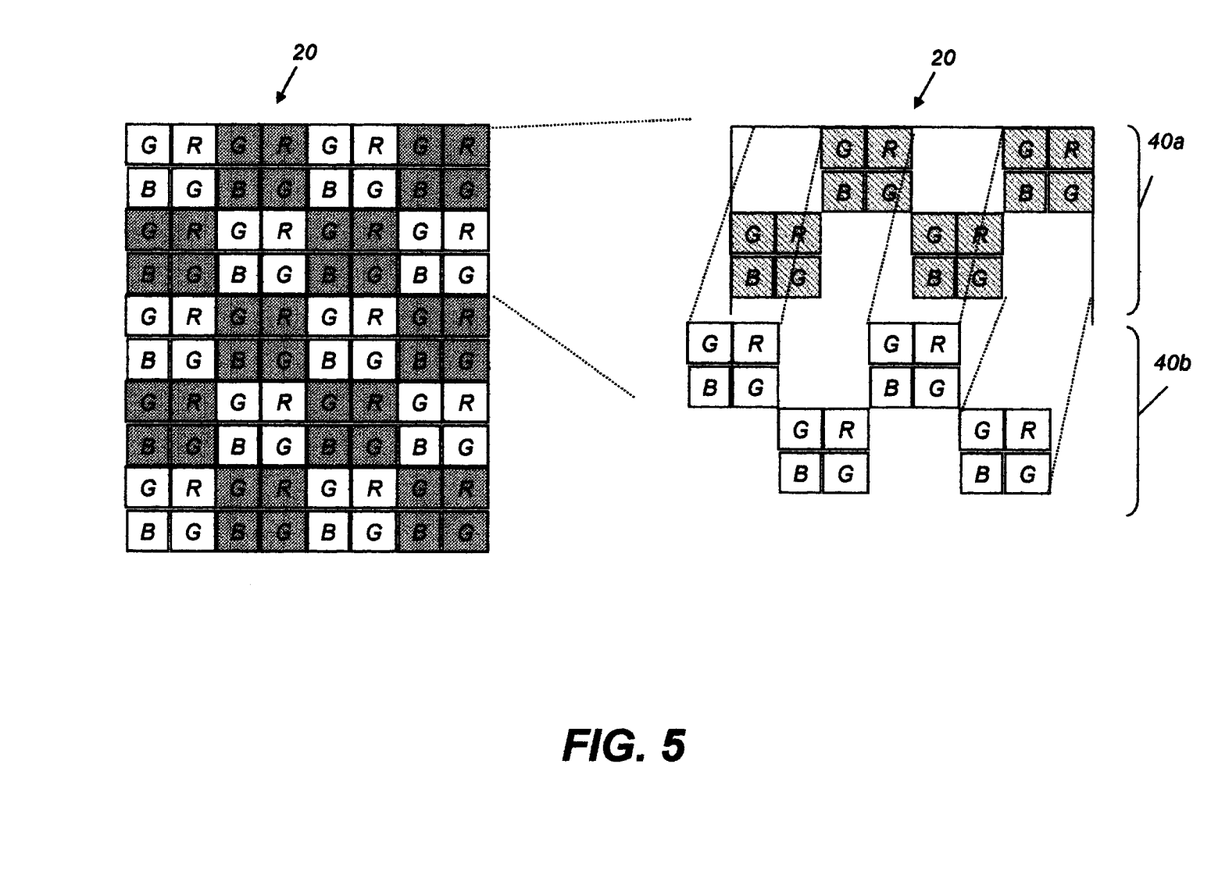
FIG. 5 is a plan view showing arrangement of an image sensor array having two component pixel subsets.

The method of the present invention is capable of being used with any sensor architecture that allows two or more subsets of pixels to be separately exposed and read, including where the two or more subsets form a partition of a sensor array 20, again using the formal definition of partition described earlier. FIG. 5 shows a portion of sensor array 20 in which two component subsets 40a (shaded) and 40b form a partition of the array. Component subset 40a can be reset, exposed, and read independently of component subset 40b. This arrangement of pixels into separately addressable component subsets allows imaging apparatus 10 (FIG. 1) to capture two separate images of the same scene content, each captured over a different time interval, using rolling readout timing.

Figure 6:
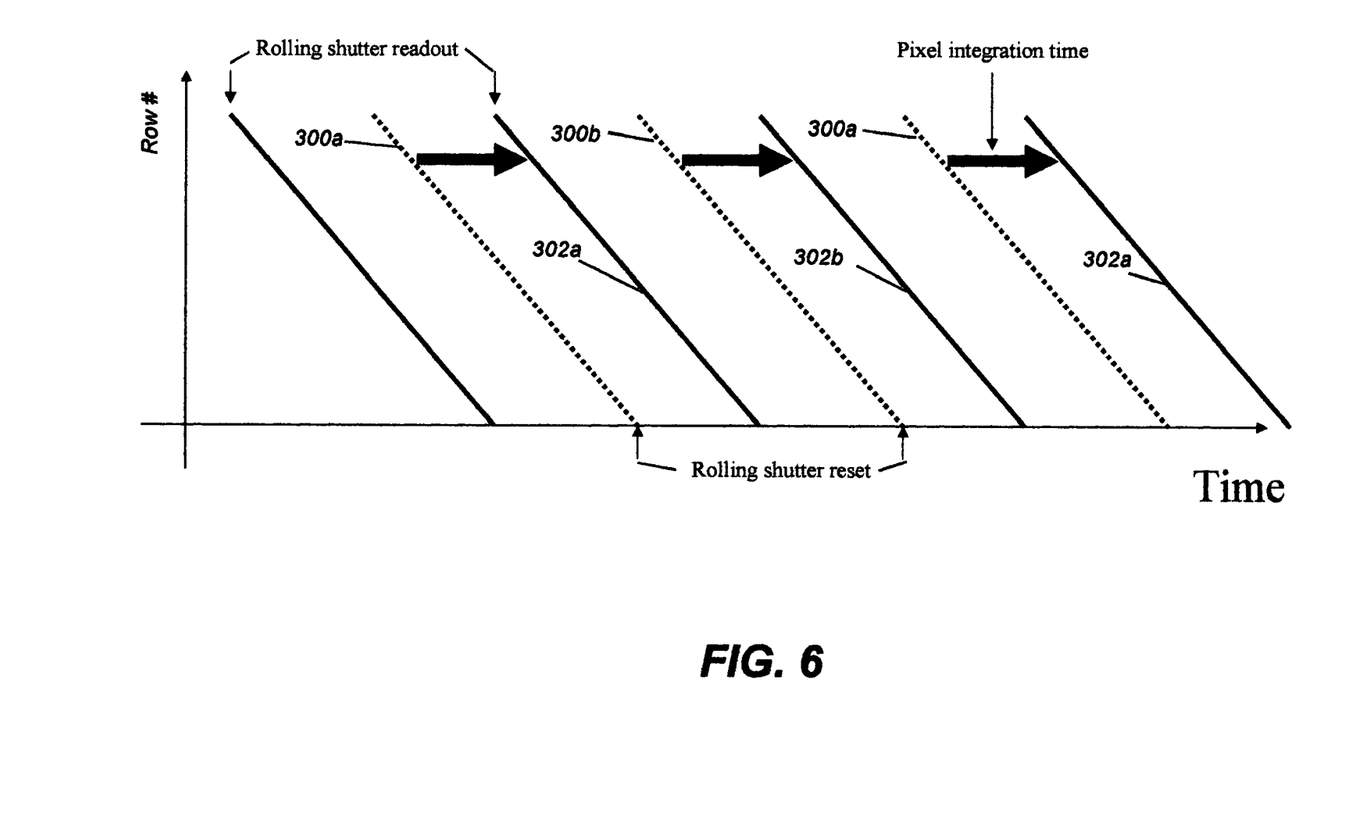
FIG. 6 is a timing diagram that shows rolling shutter timing for reading two component subsets.

FIG. 6 shows rolling readout timing that is used for the two-subset partition embodiment of FIG. 5. Using parallel notation to that given in FIGS. 4A-5, a reset 300a and a read 302a are used for subset 40a; a reset 300b and a read 302b are used for subset 40b. Thus, two successive rolling shutter readout sequences are needed to read the complete image sensor, one for reading component subset 40a, the other for reading subset 40b.

One skilled in the art can appreciate that the examples of FIGS. 5 and 6 can be extended in a number of ways. For example, a partition of image sensor array 20 can be formed from more than two subsets. Subsets may include complete rows of pixels or can be clustered groupings, as in the example of FIG. 5. Pixels within the same subset could be separated from each other. Arrangements that use panchromatic (P) pixels, as was shown in FIG. 3, could also be used. The timing arrangement of FIG. 6 could then be extended with an additional rolling-shutter readout sequence to handle each additional subset.

In an alternate embodiment, the component subsets could be partially overlapping, that is, two or more component subsets could have one or more pixels in common. This means that the subsets need not meet the strict formal definition of forming a partition of sensor 20. In another alternate embodiment, two or more component subsets could have different exposure intervals. Any two subsets can be of different size, having a different number of pixels.

Using pixel subsets in this way allows imaging apparatus 10 to obtain multiple images of the same scene content in a contemporaneous manner, that is, wherein all of the images are obtained close together in time. This allows a synthesized image to be formed from a combination of the image data obtained from the same scene in separate sequential captures. Embodiments of the present invention adapt this capability for enhancing the depth of field of imaging apparatus 10.

Depth of Field Considerations

In image capture, as discussed herein above, the f/# defines the light angles handled by the optical system and provides some quantitative measure of image resolution. The f/# for a lens is determined as the quotient of the focal length of the lens (f) divided by the diameter of its aperture (a). For a lens, having a fixed focal length f, the f/# is varied by changing the aperture size.

For an image obtained by a camera or other image capture device, depth of field (DOF) relates to the relative distance, from the image capture device, over which the subject field is considered to be "in focus" or, more precisely, to provide satisfactory definition. For this reason, the depth of field is sometimes referred to as depth of focus, although depth of focus is more properly referenced to the image side, rather than the object side of the lens. As is well known to those skilled in the imaging arts, depth of field correlates to the f/# of the imaging optics. A low f/# yields a relatively narrow depth of field. As the f/# increases within a range, depth of field also increases.

Smaller, hand-held image capture devices typically have a fixed focal length at a large distance, typically termed infinity. By providing a simple low-cost controllable aperture 14 (FIG. 1) to existing image capture device designs, embodiments of the present invention provide the capability for obtaining enhanced depth of field (DOF) information from a scene. Aperture 14 can be a mechanical aperture, including a device having a limited number of fixed settings, for example. An aperture 14 of this type can be a retrofit to existing image capture device optics, with little or no effect on the overall mechanical dimensions of the hand-held device in many embodiments.

Figure 7:
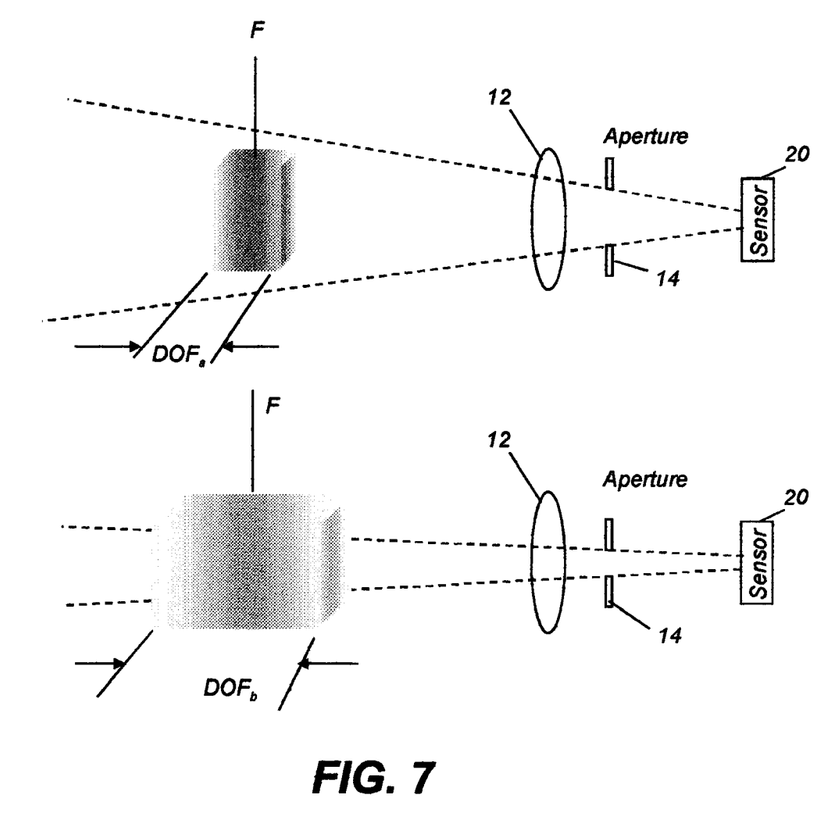
FIG. 7 is a schematic diagram showing how aperture setting affects the depth of field for the imaging apparatus.

The schematic diagram of FIG. 7 shows how the setting of aperture 14 obtains two different f/# settings for the same fixed focal length F. With aperture 14 set to a wider opening, or lower f/#, depth of field $DOF_a$ is relatively shallow. At a larger setting of aperture 14 for a higher f/#, the depth of field $DOF_b$ is considerably wider. As is well known to those skilled in the imaging arts, the smaller f/#, although it allows a smaller depth of field, is advantageous for the amount of light received, and therefore the speed with which an exposure can be obtained. At a higher f/#, more exposure time is needed in order to obtain the same light energy from a scene.

The method and apparatus of the present invention enables imaging apparatus 10 to perform contemporaneous image captures of the same scene content, each image having a different depth of field. The separate images can then be analyzed to detect portions of the image that have best definition, using autocorrelation, contrast determination, or other techniques known to those skilled in the image processing arts. Composite image data for the scene content can then be assembled, stored, and processed based on this analysis.

Figure 8:
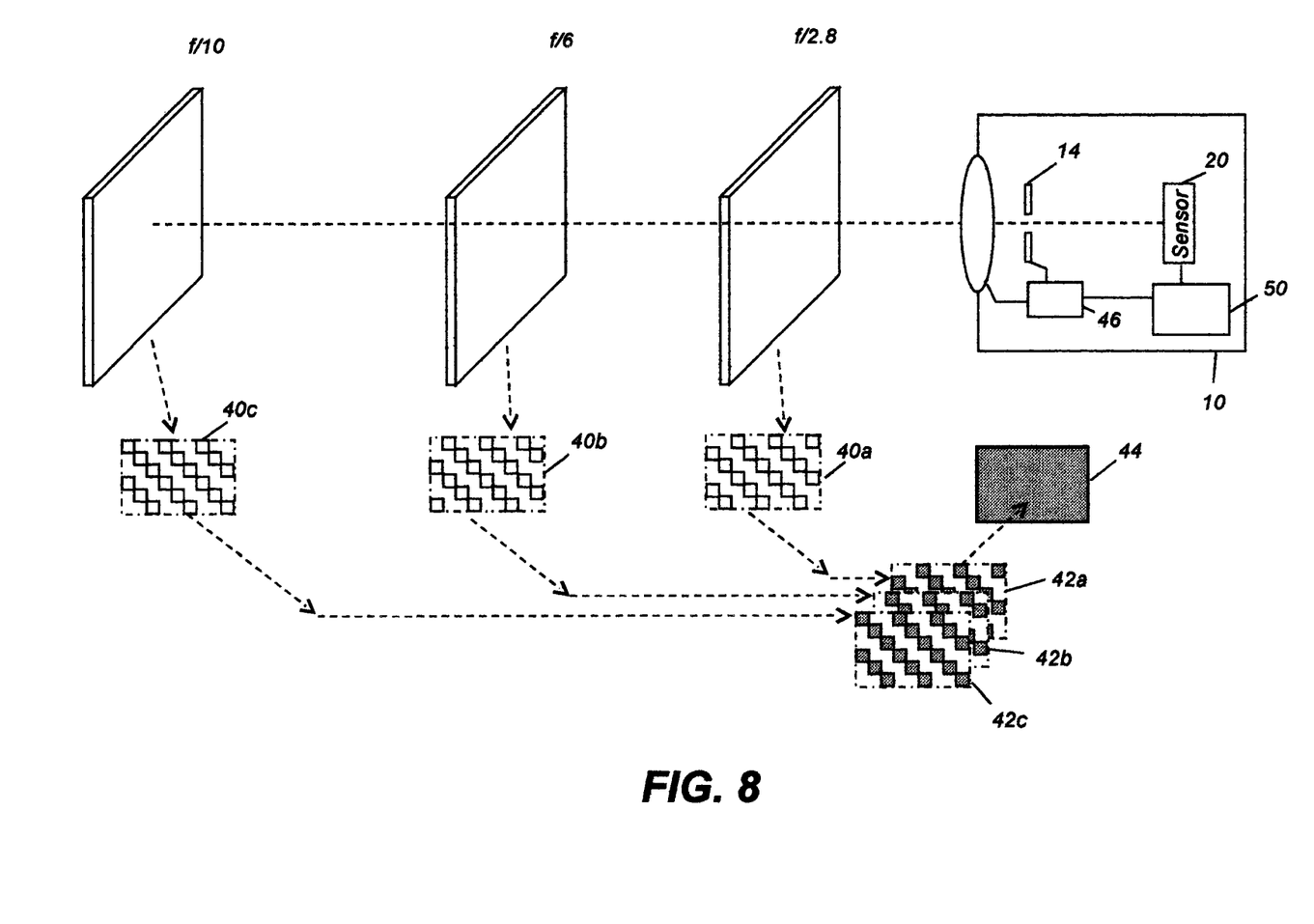
FIG. 8 is a schematic diagram that shows multiple component images of the same scene content, obtained using different f/# settings.

The schematic diagram of FIG. 8 shows this image processing sequence in one exemplary embodiment where three separate image captures are obtained, one in each of three component subsets. Control of processing is executed, according to stored or provided instructions, by a control logic processor 50 that is part of digital imaging apparatus 10 in this embodiment. Digital imaging apparatus 10 captures a first image at, for example, f/2.8 and reads the image data from pixel subset 40*a*. This provides an interim component image 42*a*. Aperture 14 is then adjusted by an actuator 46 for f/5, for example. Digital imaging apparatus 10 then captures a second image at f/5 and reads the image data from pixel subset 40*b*. This provides an interim component image 42*b*, with a correspondingly larger depth of field, shown further from imaging apparatus 10 in FIG. 8. Aperture 14 is then adjusted by actuator 46 for f/10, for example. Digital imaging apparatus 10 then captures a third image at f/10 and reads the image data from a pixel subset 40*c*. This provides an interim component image 42*c*. Data processing then extracts suitable image data content from each of component images 42*a*, 42*b*, and 42*c* to generate final image 44. Image 44 can thus have pixel data from image content obtained at three different f/# values, over progressively larger DOF ranges.

Figure 9:
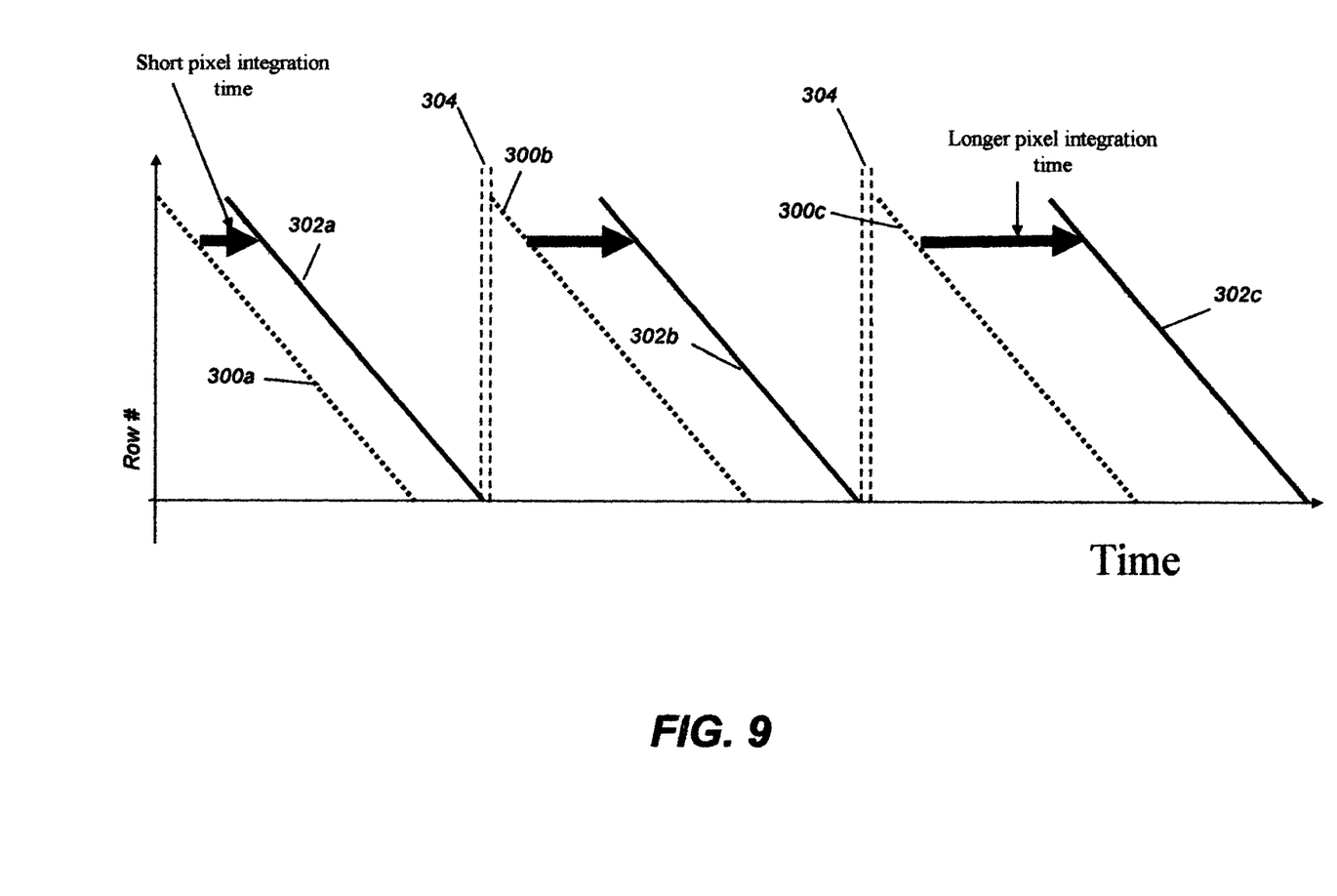
FIG. 9 is a timing diagram showing the readout and adjustment sequence for obtaining multiple images using the example of FIG. 8.

Timing for the separate reset and read operations in the example of FIG. 8 is shown, for one embodiment, in the example of FIG. 9. For example, aperture 14 is initially set for f/2.8. Exposure and readout use the rolling shutter timing shown with reset 300*a* and read 302*a*, thereby forming image 42*a* on component subset 40*a*. An interval 304 is then required for aperture 14 adjustment to f/5, for example. Then, rolling shutter readout executes for forming image 42*b* in similar fashion, with reset 300*b* and read 302*b*. Following another interval 304 for aperture 14 adjustment to f/10, for example, rolling shutter readout executes once again, forming image 42*c*, with reset 300*c* and read 302*c*.

It is instructive to make a number of observations based on the example described with reference to FIGS. 8 and 9:

Depth of field adjustment is described using adjustment of aperture 14. However, a similar operational sequence could also be used to otherwise adjust the focus of imaging apparatus 10 optics using actuator 46 for changing the relative definition of the captured subject between image captures.

Three component subsets 40*a*, 40*b*, and 40*c* are shown, one for each f/# setting. The number and arrangement of component subsets could be varied, so that exposures could be taken at two f/# settings or at four or more f/# settings.

Component subsets 40*a*, 40*b*, and 40*c* can have any appropriate distribution of their respective pixel elements. There can be advantages, for example, in providing higher pixel densities at different f/# settings, such as for obtaining additional light at relatively high f/# settings by increased pixel count. There can also be advantages in using panchromatic pixels (P) because of their higher sensitivity to (un-filtered) incident light, thus requiring shorter integration times. This can be advantageous for helping to reduce motion artifacts, for example.

The timing of the exposure intervals between reset and read operations can be varied for the separate captures, as shown in FIG. 9. With respect to the example of FIGS. 8 and 9, a longer exposure period could be used to obtain more light for the f/10 setting. Comparatively less time is needed at the f/2.8 setting.

Component subsets 40*a*, 40*b*, and 40*c* can be disjoint, as represented in FIG. 8, or can be partially overlapping, so that there is some intersection between the subsets.

Unlike conventional focus stacking techniques, the method of the present invention obtains multiple images wherein each has reduced resolution when compared against the native resolution of the sensor array. This method offers considerable flexibility, so that different arrangements of component subsets could be employed for different sets of f/# settings, for different lighting conditions, or for other variable conditions.

While rolling shutter readout is not the only readout technique that could be used with embodiments of the present invention, it has a number of advantages in its favor. Using such a technique allows more simplified camera hardware and lower parts count, strongly suggesting that this readout timing may be preferable to other methods, such as those that require a mechanical shutter of some type. In addition, rolling shutter readout of separate component subsets on the same sensor array 20 can be executed quickly, so that the effects of subject movement or inadvertent camera movement are minimized. For reading any individual component subset of pixels, readout speed can be increased over standard readout rates because of the correspondingly reduced amount of data in each readout operation.

There are a number of different ways in which the data from component images 42*a*, 42*b*, and 42*c* can be combined in order to form composite image 44, as was described with reference to FIG. 8. Image processing techniques for analyzing image content to determine areas of best focus definition or contrast, for example, are well known to those skilled in the imaging arts. The composite image 44, having advantages such as improved definition, then provides an enhanced image input for subsequent image data processing by a data processing apparatus, which may be part of imaging apparatus 10 (control logic processor 50 in FIG. 8) or may be a separate computer or other control logic processor.

Using the component subset and readout timing arrangement of the present invention allows capture of substantially the same scene content at two or more different f/# settings, generating a number of separate component images, each having a pixel resolution that, although less than the native pixel resolution of the sensor array, has a different depth of field. The resulting component images can then be combined in a number of ways to form a composite image. In one embodiment, for example, composite image 44 is formed as a data structure that includes some portion of or all of each of two or more component subsets, with or without additional image processing. In another embodiment, selected portions of each of two or more component subsets are extracted and used to form composite image 44, based on image contrast or other detectable image content attributes over various regions of the image.

In one embodiment, the same imaging apparatus 10 can be switched between modes, with a conventional image capture mode that uses substantially all pixels on sensor array 20 for one exposure sequence, and an extended depth-of-field mode, using the method of the present invention, with contemporaneous exposure of two or more subsets at different f/# settings. Changing modes can be effected using a mode control or by issuing a software instruction, using user interface 28 (FIG. 1).

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, any of a number of possible arrangements of component subsets for an image sensor could be used. Exposure times can be further adjusted for low-light conditions or for motion imaging. Any of a number of types of actuator could be used for adjusting the aperture setting. The data processing apparatus that obtains images and adjusts the depth of field between each image can be a component of digital imaging apparatus 10 itself or can be an external computer that provides operating instructions to digital imaging apparatus 10.

Thus, what is provided is an imaging system with optical system control and a readout method for an image sensor array that provides an image having an extended depth of field.

PARTS LIST

10. Digital imaging apparatus
12. Lens
14. Aperture
20. Sensor array
22. Signal processor
24. Memory
28. User interface
30. Control logic processor
40a, 40b, 40c. Subset
42a, 42b, 42c. Image
44. Composite image
46. Actuator
50. Control logic processor
100. Block
102. Block
212. Array
300, 300a, 300b. Reset
302, 302a, 302b. Read
304. Interval
$F_a$, $F_b$. Focus distance
R. Minimal repeating unit

What is claimed is:

1. A method for forming an image, implemented at least in part by a data processing apparatus, the method comprising:
   obtaining a first image of a scene from a first subset of pixels in an image sensor array at a first f/# setting, wherein an f/# setting represents a relationship between a focal length and a size of an aperture of lens associated with the image sensor array;
   adjusting imaging optics that obtain light from the scene to a second f/# setting_having the same content;
   obtaining a second image of the scene having the same content from a second subset of pixels in the image sensor array using the adjusted imaging optics, and
   forming a composite image by combining image data from at least the first and second images, wherein the composite image has an improved and larger depth of field range, and wherein the first image and the second image capture the scene having the same content and have different depth of fields.

2. The method of claim 1 wherein the second subset of pixels and first subset of pixels are disjoint.

3. The method of claim 1 wherein the second subset of pixels and first subset of pixels are partially overlapping.

4. The method of claim 1 wherein adjusting to obtain light at the second f/# setting comprises adjusting an aperture.

5. The method of claim 4 wherein the aperture has two or more fixed positions.

6. The method of claim 1 further comprising adjusting the imaging optics that obtain light from the scene at a third f/# setting and obtaining a third image of the scene from a third subset of pixels.

7. The method of claim 6 wherein the third subset of pixels is disjoint from both the first and second subsets of pixels.

8. The method of claim 1 wherein at least one of the first and second subsets comprises one or more panchromatic pixels.

9. The method of claim 1 wherein a rolling shutter readout sequence is used for obtaining the first and second images.

10. The method of claim 1 wherein the first and second subsets of pixels are exposed for a different amounts of time.

11. The method of claim 1 wherein the first and second subsets of pixels differ in number of pixels.

12. The method of claim 1 wherein adjusting the imaging optics to obtain light at the second f/# setting comprises adjusting focus.

13. The method of claim 1 wherein the first and second images are obtained substantially contemporaneously.

14. A digital imaging apparatus comprising:
   a digital sensor comprising an array of pixels, wherein the pixels are organized into at least first and second subsets of pixels, wherein each subset of pixels can be separately read;
   an aperture coupled to an actuator for actuation to at least a first and second f/# setting, wherein an f/# setting represents a relationship between a focal length and a size of an aperture of lens associated with the digital sensor; and
   a control logic processor responsive to instructions for controlling the actuator to set the aperture to the first f/# setting and obtain a first image data content from the first subset of pixels and to set the aperture to the second f/# setting and obtain a second image data content from the second subset of pixels, wherein a composite image is formed by combining at least the first image data content and the second image data content, wherein the composite image has an improved and larger depth of field range, and wherein the first image data content and the second image data content capture the scene having the same content and have different depth of fields.

15. The apparatus of claim 14 wherein the second subset of pixels and first subset of pixels are disjoint.

16. The apparatus of claim 14 wherein the second subset of pixels and first subset of pixels are partially overlapping.

17. A method for forming an image, comprising:
   contemporaneously capturing a plurality images of a same scene content using a plurality of pixel subsets that form a plurality of partitions of a sensor array, wherein each of the pixel subsets is capable of separately exposed and read, each image having a different depth of field and a correspondingly different image resolution based on different f/# settings, wherein an f/# setting represents a relationship between a focal length and a size of an aperture of lens associated with the sensor array,
   determining for each image at least one portion of the image having an image resolution superior to image resolutions of other portions of the image,
   forming a composite image of the scene content by combining image information from each of the plurality of images, wherein the composite image has an improved and larger depth of field range, and
   selecting the image information for each image from the at least one portion of each image having superior image resolution.

18. The method of claim 17 for forming an image, wherein:
   each image of the plurality of images is of reduced resolution from an image array resolution of an image array capturing each of the plurality of images.

* * * * *